(12) United States Patent
Denome

(10) Patent No.: US 11,891,239 B2
(45) Date of Patent: Feb. 6, 2024

(54) LOW PROFILE TRANSPORTABLE HOLDING TANK

(71) Applicant: Crescent Tank Mfg., Bloomfield, NY (US)

(72) Inventor: Robert P. Denome, Bloomfield, NY (US)

(73) Assignee: Cresent Tank Mfg., Bloomfield, NY (US)

( * ) Notice: Subject to any disclaimer, the term of this patent is extended or adjusted under 35 U.S.C. 154(b) by 0 days.

(21) Appl. No.: 17/885,090

(22) Filed: Aug. 10, 2022

(65) Prior Publication Data

US 2022/0380116 A1 Dec. 1, 2022

Related U.S. Application Data

(63) Continuation-in-part of application No. 16/892,265, filed on Jun. 3, 2020, now Pat. No. 11,420,815.

(51) Int. Cl.
*B65D 88/12* (2006.01)
*B65D 90/16* (2006.01)

(52) U.S. Cl.
CPC ........... *B65D 88/128* (2013.01); *B65D 90/16* (2013.01)

(58) Field of Classification Search
CPC .................................................. B65D 88/128
USPC .......... 280/830, 699; 137/255; 180/36, 69.4, 180/303, 310, 225; 220/18; 410/68
See application file for complete search history.

(56) References Cited

U.S. PATENT DOCUMENTS

| | | | | |
|---|---|---|---|---|
| 2,577,836 A | * | 12/1951 | Willson | B60P 3/36 296/156 |
| 3,131,949 A | * | 5/1964 | Black | B61D 5/06 220/560.04 |
| 3,187,425 A | * | 6/1965 | Black | B60P 3/2255 29/469 |
| 3,578,348 A | * | 5/1971 | Reinke | A01C 23/008 111/925 |
| 3,604,719 A | * | 9/1971 | Kerr | B60P 3/2205 264/225 |
| 4,358,054 A | * | 11/1982 | Ehrat | B05B 9/06 239/304 |

(Continued)

FOREIGN PATENT DOCUMENTS

| | | | | |
|---|---|---|---|---|
| CA | 3090466 C | * | 3/2021 | ............. B60P 3/221 |
| CN | 104724407 B | * | 5/2017 | ............ B60P 3/2215 |

(Continued)

*Primary Examiner* — Lori L Baker
(74) *Attorney, Agent, or Firm* — Jong Patent Firm; Cheng Ning Jong; Tracy P. Jong

(57) ABSTRACT

A low profile holding tank-evacuable to a pressure differential of at least about 10" of mercury that includes a plurality of support structures, a peripheral wall, an upper outer layer of mild steel and a lower outer layer of mild steel, each of the upper outer layer and the lower outer layer is configured to be up to about ¼ inches thick. At least some of the plurality of support structures are required to be fixedly connected to upper and lower outer layers to prevent damages incurred on the low profile holding tank by repeated applications of the pressure differential of at least about 10" of mercury. At least some of the connections are required to be made from the outside of the tank via a welding, e.g., plug welding, technique.

3 Claims, 12 Drawing Sheets

(56) References Cited

U.S. PATENT DOCUMENTS

| | | | | |
|---|---|---|---|---|
| 4,543,183 | A * | 9/1985 | Petretti | E03F 7/10 210/241 |
| 4,728,144 | A * | 3/1988 | Crean | B60P 3/32 296/156 |
| 5,593,070 | A * | 1/1997 | Steadman | B65D 88/128 222/608 |
| 6,065,686 | A * | 5/2000 | Betts-Williams | A01M 7/0089 222/617 |
| 6,154,917 | A * | 12/2000 | Zahuranec | A47L 5/32 15/328 |
| 6,340,177 | B1 * | 1/2002 | Granderson | B60P 3/224 280/833 |
| 6,598,242 | B1 * | 7/2003 | Denome | B60R 15/04 220/651 |
| 6,723,173 | B1 * | 4/2004 | Golladay | A47K 11/00 4/321 |
| 7,192,060 | B2 * | 3/2007 | Warrick | B60P 3/22 4/321 |
| 7,621,565 | B2 * | 11/2009 | Ross, Jr. | B60K 15/07 280/830 |
| 8,950,530 | B2 * | 2/2015 | Niedzwiecki | B60K 6/46 280/33.998 |
| 9,187,891 | B2 * | 11/2015 | Aberle | E03F 11/00 |
| 9,403,640 | B1 * | 8/2016 | Crain | B65D 88/54 |
| 9,464,451 | B1 * | 10/2016 | Skaw | B28B 1/14 |
| 9,499,105 | B1 * | 11/2016 | Long | B60P 3/055 |
| 10,343,583 | B1 * | 7/2019 | Moravec | B62D 33/02 |
| 10,954,661 | B2 * | 3/2021 | Polston | B08B 9/0495 |
| 10,967,300 | B2 * | 4/2021 | Droke | B01D 19/00 |
| 11,396,419 | B1 * | 7/2022 | Peterkin | C02F 11/13 |
| 11,420,815 | B2 * | 8/2022 | Denome | B65D 88/12 |
| 11,493,173 | B2 * | 11/2022 | Ramoo | F17C 3/00 |
| 11,608,015 | B2 * | 3/2023 | Mann | B60R 15/04 |
| 2003/0127255 | A1 * | 7/2003 | Hammonds | B62D 11/06 280/830 |
| 2008/0223468 | A1 * | 9/2008 | Stegall | B60R 15/00 137/899 |
| 2010/0147860 | A1 * | 6/2010 | McKenzie | E21B 43/26 220/626 |
| 2010/0320727 | A1 * | 12/2010 | Haut | B65D 88/128 280/423.1 |
| 2012/0137955 | A1 * | 6/2012 | Van Tassel | B63B 25/004 62/48.1 |
| 2013/0121781 | A1 * | 5/2013 | Spencer | B60P 3/222 410/68 |
| 2013/0134170 | A1 * | 5/2013 | Blanco | B61D 5/06 228/101 |
| 2015/0175365 | A1 * | 6/2015 | Picard | B01J 49/75 414/21 |
| 2016/0059764 | A1 * | 3/2016 | Hamm | B65D 90/34 280/837 |
| 2016/0129826 | A1 * | 5/2016 | Yielding | B60P 3/2215 29/428 |
| 2017/0096092 | A1 * | 4/2017 | Cannon | B60P 3/2215 |
| 2018/0209133 | A1 * | 7/2018 | Polston | E03F 9/00 |
| 2019/0060794 | A1 * | 2/2019 | Droke | B01D 21/0006 |
| 2020/0284073 | A1 * | 9/2020 | Thomas, II | E05C 1/002 |
| 2020/0406809 | A1 * | 12/2020 | Peters | B60P 3/2215 |
| 2023/0242030 | A1 * | 8/2023 | Peterkin | B65D 88/128 137/340 |

FOREIGN PATENT DOCUMENTS

| | | | | |
|---|---|---|---|---|
| DE | 102004016812 | A1 * | 10/2005 | B60P 1/6481 |
| DE | 102008063321 | B4 * | 11/2010 | B65D 88/128 |
| EP | 3034413 | A1 * | 6/2016 | B29C 44/18 |
| EP | 3822120 | A1 * | 5/2021 | B60P 3/2215 |
| WO | WO-02100741 | A1 * | 12/2002 | B01F 13/1005 |
| WO | WO-2012016164 | A1 * | 2/2012 | B60P 3/2215 |
| WO | WO-2021069275 | A1 * | 4/2021 | B65D 88/128 |

* cited by examiner

LOW PROFILE TRANSPORTABLE HOLDING TANK

PRIORITY CLAIM AND RELATED APPLICATIONS

This continuation-in-part application claims the benefit of priority from non-provisional application U.S. Ser. No. 16/892,265 filed on Jun. 3, 2020. Said application is incorporated by reference in its entirety.

BACKGROUND OF THE INVENTION

1. The Field of the Invention

The present invention relates to a low profile transportable holding tank. More specifically, the present invention is directed to a low profile transportable holding tank capable of being completely drained even when a drainage channel of the low profile transportable holding tank is disposed on one edge of the low profile transportable holding tank.

2. Background Art

To transport equipment useful for servicing customers of the waste industry, stock trucks are typically modified to accommodate those equipment such that they can be brought to the customer sites for use therewith. Waste from portable toilets, waste oil from restaurants and service stations, etc., and concrete slurry from cutting machines may be transported in respective holding tanks to their appropriate plants for processing, respectively. Truckbeds/frames of class 5 (Federal Highway Administration—Gross Vehicle Weight Ratings (lbs) 16,001-19,500) to class 8 (Federal Highway Administration Gross Vehicle Weight Ratings (lbs)>33,001) trucks are typically downwardly-sloped. Therefore, a holding tank having a constant depth will conform to the shape of the bed/frame and will also slope similarly or downwardly. This means the floor of the tank will also slope downwardly and as the natural slope of the tank follows the slope of the truckbed/frame, the tank necessarily drains forwardly naturally, thereby requiring a drain of the tank to be disposed at the front portion of the tank.

U.S. Pat. No. 6,598,242 to Applicant discloses a low profile transportable holding tank for accepting waste from portable toilets. The holding tank is carried on a flatbed vehicle and has a flat deck for cargo, thus effectively increasing the cargo-carrying capacity of the vehicle compared with that available if the vehicle were carrying a conventional holding tank. Internal reinforcement enables the holding tank to withstand a partial vacuum imposed for pumping waste into the tank. Denome discloses a tank having a drainage channel disposed on the rear portion of the tank.

There exists a need for a holding tank system having a holding tank of constant depth which can be completely drained upon being mounted on a truckbed as the floor of the holding tank is inclined downwardly from the floor into a drain channel.

SUMMARY OF THE INVENTION

In accordance with the present invention, there is provided a low profile holding tank capable of being evacuated to a pressure differential of at least about 10" of mercury, the low profile holding tank including at least one support structure, an upper outer layer and a lower outer layer each constructed from mild steel that is no thicker than about ¼ inches and a peripheral wall, the upper outer layer, the lower outer layer and the peripheral wall cooperate to define a space, the at least one support structure is connected to the upper outer layer at an upper connection point and the at least one support structure is connected to the lower outer layer at a lower connection point, wherein at least one of the upper connection point and the lower connection point is made from outside of the space.

In one embodiment, the at least one of the upper connection point and the lower connection point is made using plug welding. In one embodiment, the low profile holding tank is a low profile transportable holding tank.

An object of the present invention is to provide a holding tank that is easily drainable without requiring the vehicle that carries it to be disposed in a specific manner.

Another object of the present invention is to provide a low profile transportable holding tank that is long lasting and free of failures that prohibit the holding tank from holding partial vacuum.

Another object of the present invention is to provide a low profile transportable holding tank that is cleanable without requiring manual intervention.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
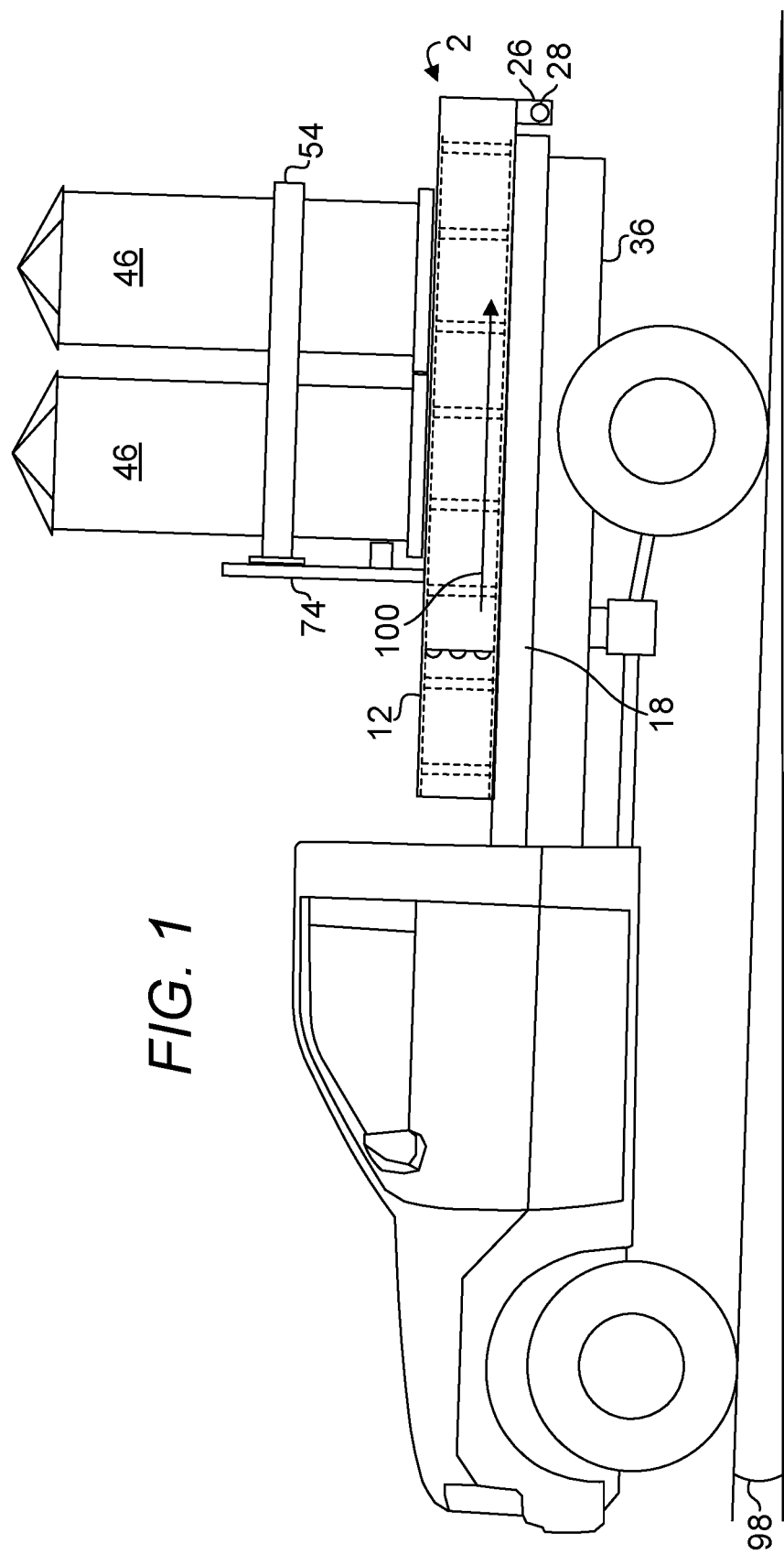
FIG. 1 is a side view of a transportable sewage system aboard a vehicle parked on an incline.

2—low profile holding tank
4—support assembly
6—support pillar
8—support strip
10—reinforcing strip
12—deck sheet
14—tank floor sheet
16—transverse support bar
18—flat truckbed
20—depth of holding tank
22—hole
24—weld
26—drainage channel
28—discharge port
30—wall
32—inlet port
34—evacuation port
36—vehicle
38—downward slope with respect to horizontal plane
40—horizontal plane
42—upward slope with respect to horizontal plane
44—ground
46—portable toilets
48—height of horizontal plane
50—rise
52—run
54—strap
56—handles
58—anchors
60—"fish-eye" sight glasses
62—gap
64—low profile transportable waste system
66—span between support pillars disposed along a widthwise direction of the tank
68—pumping system
70—connection
72—vacuum hose
74—transverse headboard
76—lift gate
78—span between support pillars disposed along a lengthwise direction of the tank
80—crack
82—waste oil tank
84—water tank
86—concrete cutter
88—concrete
90—bracket
92—offset
94—nozzle
96—heading of nozzle with respect to side wall
98—incline
100—direction
102—joist
104—stretched portion
106—droop
108—deck
110—distance between nozzles
112—first plane
114—second plane
116—indent
118—trailer deck
120—strap
122—support member
124—tab
126—suction hose
128—hooks
130—suction tip
132—valve
134—hose holder
136—prong
138—cross bar
140—support leg
142—stabilizer bar
144—rail
146—tool box
148—mounting plate
150—strap

PARTICULAR ADVANTAGES OF THE INVENTION

The present low profile transportable holding tank is configured to naturally drain from front to rear at which a drain is disposed. Compared to a holding tank having a drain disposed on the front portion of the holding tank, a rear-draining holding tank allows an operator access to the drain at a more convenient location, i.e., on one end of the vehicle upon which the holding tank is disposed. A vehicle or truck to which a holding tank is coupled, typically includes a truckbed that is disposed at a downward slope. A holding tank that follows the slope of the truckbed would be required to be disposed with a similar slope, making the drain necessarily disposed on the front portion of the holding tank. However, the present low profile transportable holding tank is elevated in the front not only to overcome the downward slope of the truckbed to which it is disposed but also to create a net upward slope for the holding tank to drain towards the rear end of the holding tank. The upward slope of the holding tank removes the need for artificially disposing the truckbed in a manner to cause an upward slope as the holding tank has already been mounted with an upward slope relative to the truck to which the holding tank is mounted.

The present low profile transportable holding tank is capable of a long service life without requiring regular maintenance or repair and capable of withstanding at least about 40,000 partial vacuum cycles and about 600,000 miles of roading without excessive stretching and cracking as the outer layers are properly secured to limit the deformation that can occur due to repeated applications or positive and/or negative pressure to the holding tank. As the low profile holding tank is constructed from a mild steel layer that is no thicker than about ¼ inches, it is suitable for roading as it is sufficiently lightweight and capable of transporting a higher load.

The present low profile transportable holding tank is capable of assisted cleaning and it includes only two nozzles disposed at suitable locations such that the interior space of holding tank can be accessed by the nozzles configured to receive a rinsing, cleaning and/or disinfecting fluid supply or steam of about 3 GPM at about 4000 psi.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

For a rear-draining holding tank to be completely drained, it is crucial to slope the holding tank upwardly, i.e., with the front end of the holding tank higher than the rear end of the holding tank, to ensure that the contents of the holding tank can eventually collect in a transverse drainage channel disposed on a rear edge of the holding tank and exit the drainage channel via a discharge port disposed at a low point in the drainage channel.

Figure 2:
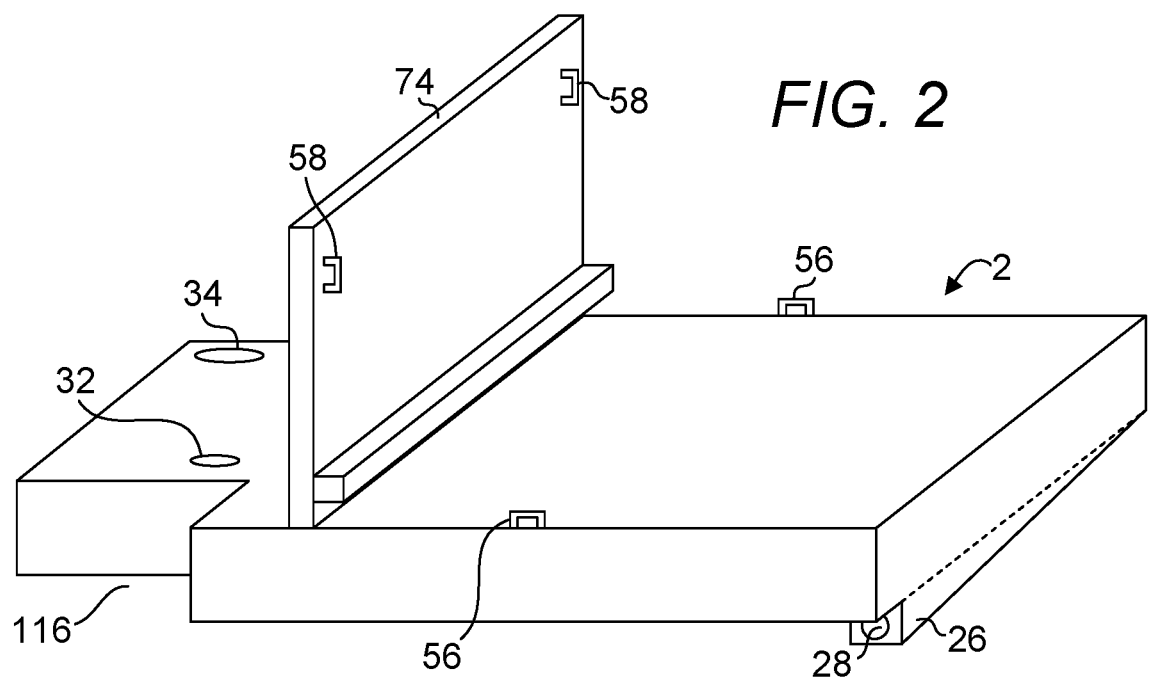
FIG. 2 is a top rear perspective view of a low profile holding tank for a transportable waste system.
Figure 3:
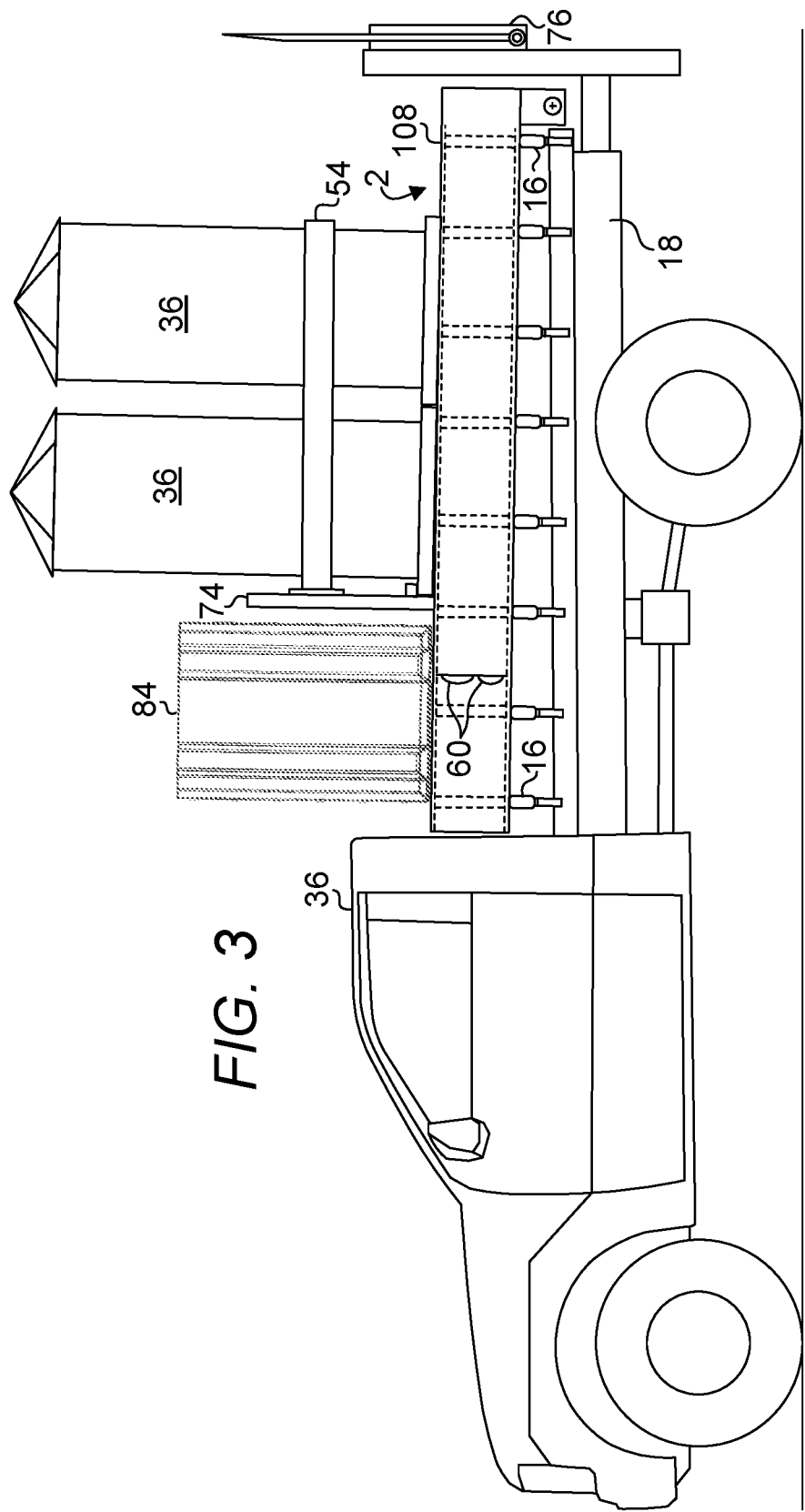
FIG. 3 is a side view of a transportable sewage system aboard a vehicle.

FIG. 1 is a side view of a transportable sewage system aboard a vehicle 36 parked on an incline, e.g., at an angle of greater than 0 degree, depicting a vehicle that is disposed at a slope that allows the holding tank to be completely drained as wastes contained therein flows downwardly in the direction 100. Although the holding tank 2 is capable of draining completely when disposed at an incline as shown in FIG. 1, waste stations or waste-receiving facilities do not have grounds disposed at an incline, rendering the vehicle incapable of completely draining its holding tank. In order to completely drain the holding tank 2 without the aid of ramps, the station or ground on which the vehicle 36 is disposed must be sufficiently elevated at the front end of the vehicle to create sufficient incline 98 for the contents of the holding tank to flow into the drainage channel 26 by gravity. The drainage channel is provided at one edge of the tank floor. The drainage channel slopes down towards an effluent discharge port 28 below the level of the tank floor. The discharge port is typically equipped with a gate valve. The complete draining of the holding tank makes cleaning or rinsing of the interior of the holding tank more effective as this process would not involve first cleaning out the residual wastes retained in the holding tank 2 before its subsequent uses. Complete draining of the holding tank 2 reduces the exposure of the interior surfaces of the holding tank 2 to possible harmful residual materials in tank over prolonged periods of time. Further, unnecessary hauling of residual wastes increases the burden of transportation costs and reduces useful capacity of the holding tank 2. FIG. 2 is a top rear perspective view of a low profile holding tank for a transportable waste system. The holding tank 2 has at least one inlet port 32 for admitting waste from a portable toilet 46 and an evacuation port 34. The truck to which the holding tank 2 is coupled includes a truckbed disposed at a downward slope, i.e., the front end of the truckbed is disposed lower than the rear end of the truckbed. A holding tank disposed on a truckbed necessarily follows the slope of the truckbed and would be required to be disposed with a similar slope, making the drain to be necessarily disposed on the front end of the holding tank. However, the present low profile transportable holding tank, as shown in FIG. 3, is elevated in the front end, not only to overcome the downward slope of the truckbed to which it is disposed but also to create an upward slope for the holding tank to drain towards the rear end of the holding tank. The upward slope of the holding tank removes the need for artificially disposing the truckbed in a manner to cause a net upward slope as the holding tank has already been mounted with an upward slope relative to the truckbed to which the holding tank is mounted.

Figure 4:
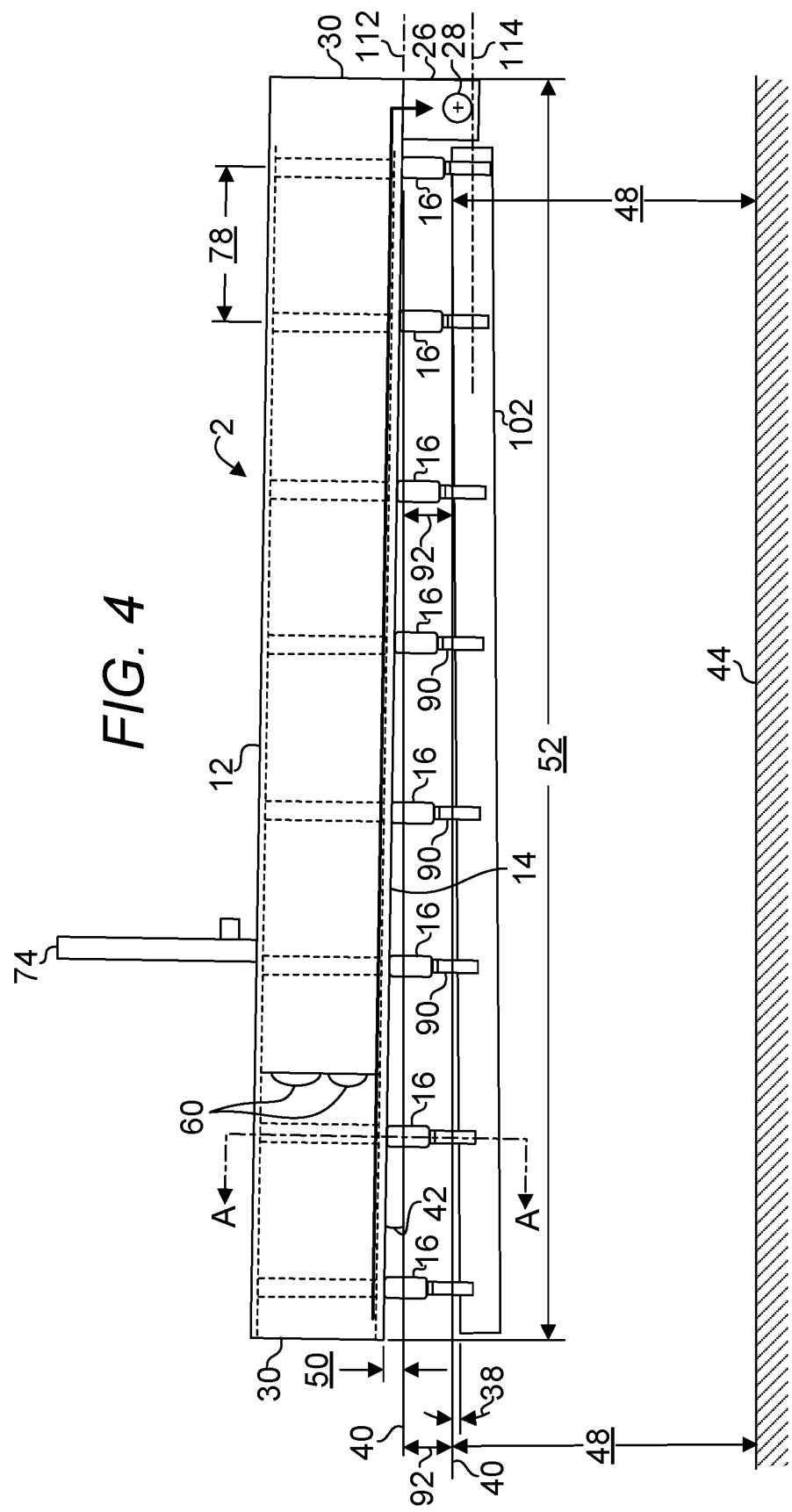
FIG. 4 is a diagram depicting a partially transparent side view of a holding tank disposed at an upward slope.

FIG. 3 is a side view of a transportable sewage system aboard a vehicle 36. A holding tank system is shown disposed on the truckbed 18. FIG. 4 is a diagram depicting a partially transparent side view of a holding tank disposed at an upward slope. The horizontal plane 40 relative to the joists is disposed at a height 48 from the ground 44 level. It shall be noted that the holding tank system includes a holding tank 2 including a floor disposed in a first plane 112, the holding tank configured to be supported on at least a joist 102 (preferably two that are spaced transversely) disposed in a second plane 114, wherein the second plane is disposed at an incline with respect to the first plane. In one embodiment, the incline is configured such that the first plane 112 is disposed at an angle of from about 1 degree to about 5 degrees with respect to a horizontal plane 40 of a vehicle to which the joist is disposed. In the embodiment shown, the holding tank is a low profile transportable holding tank. In one embodiment, the floor further includes a front end and a rear end and the joist includes a front end and a rear end, wherein the floor and the joist 102 converge from their respective front end to their respective rear end. Therefore, in order to ensure that a rear-draining tank can be fully drained, a holding tank is disposed such that a first plane in which a floor of the holding tank is disposed, is disposed at an incline with respect to a second plane in which one or more joists 102 are disposed.

Referring back to FIG. 3, a lift gate 76 is provided to facilitate loading and unloading of the vehicle with portable toilets 46 while serving as a final recourse when the lift gate 76 is disposed in its stowed position for preventing the portable toilets 46 from leaving the truck due to a failure in the securement of the portable toilets 46 to the vehicle. The lift gate 76 is essentially a platform capable to be disposed in a tilted orientation to serve as a gate in its stowed position and a level orientation at two levels, i.e., a deck level and ground 44 level for bridging the deck level and the ground level. In yet another embodiment, a crane is provided alongside the lift gate to further aid the loading and unloading of portable toilets. A transverse headboard 74 is mounted atop the deck 108 by a suitable fastening means. The headboard 74 defines a line dividing the deck 108 into a front deck and a rear deck, the rear deck corresponding to the rear end of the holding tank 2 with the drainage channel 26. The headboard 74 is used to secure one or more portable toilets 36 carried atop the rear deck for transportation to or from a use site and it has fastening means such as a strap 54 that passes through anchors 58 disposed on the headboard 74 or handles 56 disposed on the holding tank 2, the strap is passed around the portable toilets 36, e.g., as many as ten, and secured with a buckle. In one embodiment, the headboard is configured to be modular. In other words, the headboard is not welded to the holding tank and can be removed, e.g., by removing fasteners that secure the headboard to the holding tank for repair and service. The headboard can be made of materials other than mild steel, e.g., aluminum and stainless steel as the headboard is not a load bearing member. In addition to its function as a structure to help contain cargo, the headboard is useful for securing a water tank disposed on the front deck as shown in FIG. 3. At least one waste-level indicator is provided on the holding tank 2, preferably two "fish-eye" sight glasses 60, e.g., of 3-inch and 5-inch diameter, both disposed in a vertical alignment to allow viewing of a wide range of waste levels.

Figure 5:
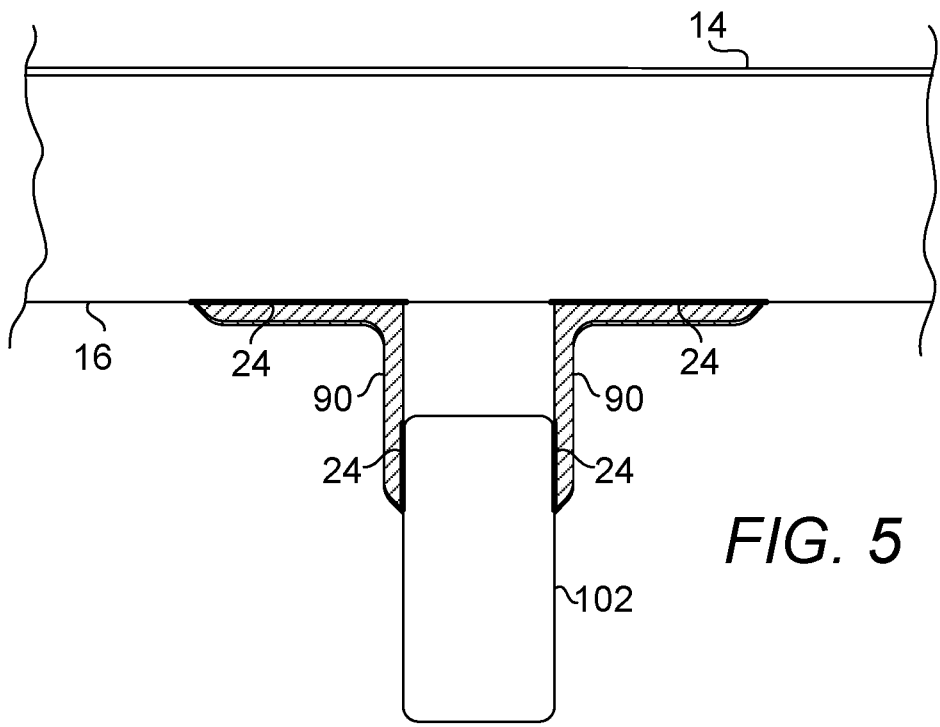
FIG. 5 is a partial cross-sectional view of a support structure configured for resulting in a holding tank having an upward slope as taken along line A-A of FIG. 4.

FIG. 5 is a partial cross-sectional view of a support structure configured for resulting in a holding tank having an upward slope as taken along line A-A of FIG. 4. The holding tank 2 is supported on and secured to a plurality of transverse support bars 16 welded to the tank floor sheet 14. The transverse support bars 16 are in turn supported on one or more joist 102 by means of a plurality of bracket sets. Each bracket 90 of the bracket sets is connected to a transverse support bar 16 at its upper end and to a joist 102 at its lower end, both by means of welding. Referring back to FIG. 4, the angle between the first plane 112 and the second plane 114 is then an aggregate of the effects of the downward slope 38, disposed at an angle of, e.g., from about 1 degree to about 5 degrees, of the joist 102 with respect to a horizontal plane 40 and the upward slope 42 of the tank floor sheet 14 with respect to a horizontal plane 40. See the rise 50 over the run 52 which constitute this upward slope 42. The upward slope 42 of the holding tank removes the need for artificially disposing the truckbed in a manner to cause an upward slope as the holding tank has already been mounted with an upward slope relative to the truckbed to which the holding tank is mounted. In the embodiment shown in FIGS. 3 and 4, an offset 92 disposed between the horizontal planes 40, one related to the tank floor sheet 14 and the other to a joist 102, facilitates the use of a forklift or other hoisting chains and other lifting equipment should the holding tank 102 need to be removed and installed.

Figure 6:
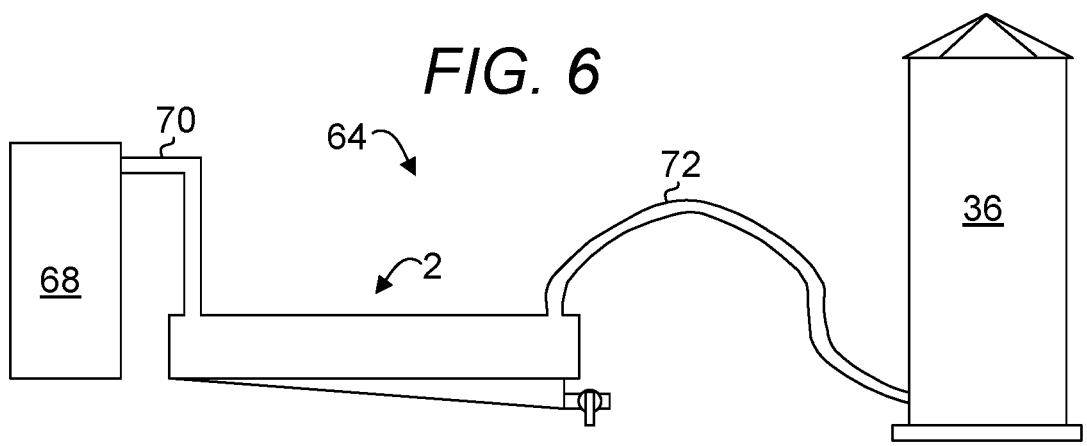
FIG. 6 is a schematic of a transportable sewage system connected to a portable toilet.

FIG. 6 is a schematic of a transportable sewage system 64 connected to a portable toilet. The evacuation port 34 is connected via a connection 70 to a standard pumping system 68 that includes a vacuum pump, typically driven by an electric-start internal combustion engine, a vehicle transmission mounted to Power Take Off (PTO), a hydraulic-driven power unit, a combustible engine-driven unit although other types of drive may be used. The pumping system 68 is carried atop the front deck along with other equipment such as a 250 or 350-gallon water tank 84, a wash down pump, and a water hose and hose reel. Although the holding tank 2 is removable from the vehicle 36, it generally remains on the truckbed 18 for an extended time, and the connection 70 may therefore be hard-plumbed. The inlet ports 32 have valves (not shown) for admitting air to equalize internal and external pressures when pumping is complete. The pumping system 68 includes primary and secondary vacuum traps which preclude the entry of fluids from the holding tank 2 into the pump, and also isolate the pump from the holding tank 2 once the latter has been filled to some preselected level. One or more internal anti-surge plate can be added to block contents of the holding tank from surging to one or more traps during transport, keeping the contents from prematurely activating one or more traps. Typically, a 2-inch diameter flexible vacuum hose 72 is used to connect the inlet port 32 and the portable toilet 36, using aluminum cam lock quick disconnect fixtures. In one embodiment, the water tank 84 is a rotationally molded or rotomolded polymeric, e.g., plastic 350-gallon tank with a wall thickness of from about ⅜ inch to about ½ inch. The tank is formed in a dark color, e.g., black, to eliminate the penetration of sunlight to inhibit bacterial or algae growth. Further, as the water tank is constructed from a polymer, e.g., plastic, it is sufficiently flexible to accommodate temperature variations of the stored water without cracking, making it more reliable than water tanks constructed from metals. Yet further, as the water tank is constructed from a polymer, e.g., plastic, the water tank is free of corrosion as in the case of aluminum and sometimes stainless steel, both of which are common materials used in vessels built to store and transport water.

Figure 7:
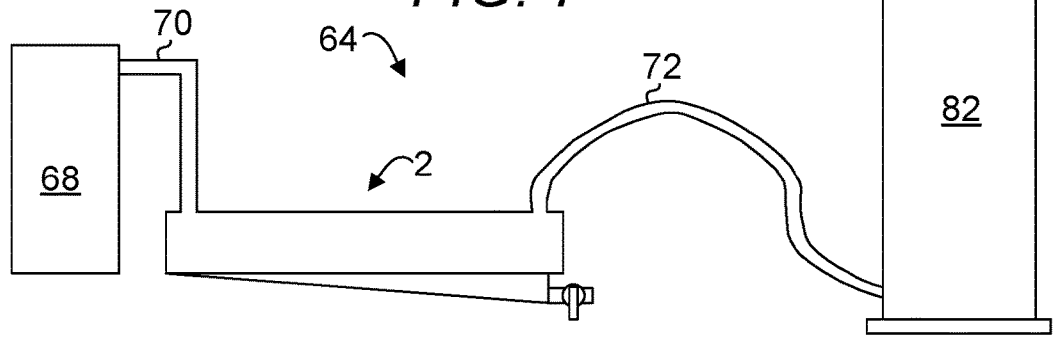
FIG. 7 is a schematic of a transportable waste oil system connected to a waste oil tank.

FIG. 7 is a schematic of a transportable waste oil system 64 connected to a waste oil tank 82. Here, the holding tank 2 is used for transporting waste oil from restaurants, service stations and transport containers, etc., to be stored and/or processed prior to its use in internal combustion engines, industrial burners, etc. For some time, it has been known that used cooking oil is a valuable raw material, from which after cleaning and conversion processes, new oils, fats or even biofuels can be obtained. There are large quantities of used cooking oils in restaurants and in the food industry. With relatively simple means, it is worthwhile to set up tanks 82 in the appropriate places to collect used cooking oils transferred, e.g., from deep fryers by restaurant staff. To use the used cooking oils, these tanks 82 are emptied into the present waste oil tank 82 by means of a partial vacuum and transported to a facility for processing or use. Multiple waste oil tanks 82, e.g., four to eight may be transported atop the deck of the holding tank with each having a storage volume of from about 100 gallons to about 250 gallons.

Figure 8:
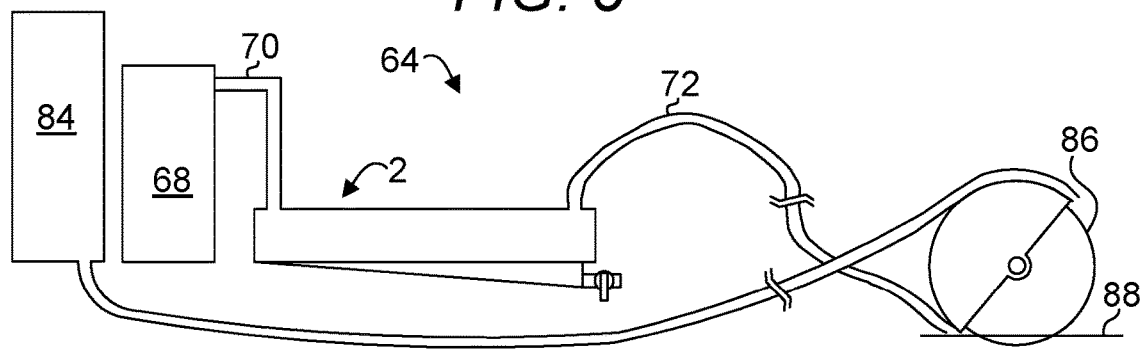
FIG. 8 is a schematic of a transportable concrete slurry system connected to a concrete cutter.

FIG. 8 is a schematic of a transportable concrete slurry system 64 connected to a concrete cutter. Here, the holding tank 2 is used for transporting concrete slurry resulting from concrete cutting. Shown herein is a concrete 88 surface being cut using a concrete cutter 86. A supply of water is provided from a water tank 84 to cool the cutter 86, lubricate the cutter 86 and to suppress dust generated in the cutting process. The mixture of water and concrete solids constitute a concrete slurry which can be drawn into the holding tank 2 by means of a partial vacuum. The ability to evacuate concrete solids and dust during the cutting process eliminates the need for a secondary process that collects the concrete slurry left behind after the cutting process, shortening the overall process that involves the cutting step. The present holding tank 2 may also be used to collect the products of other concrete work, e.g., concrete abrading, grinding, coring, grooving, etc. Any equipment associated with these processes may be transported atop the deck of the holding tank.

Figure 9:
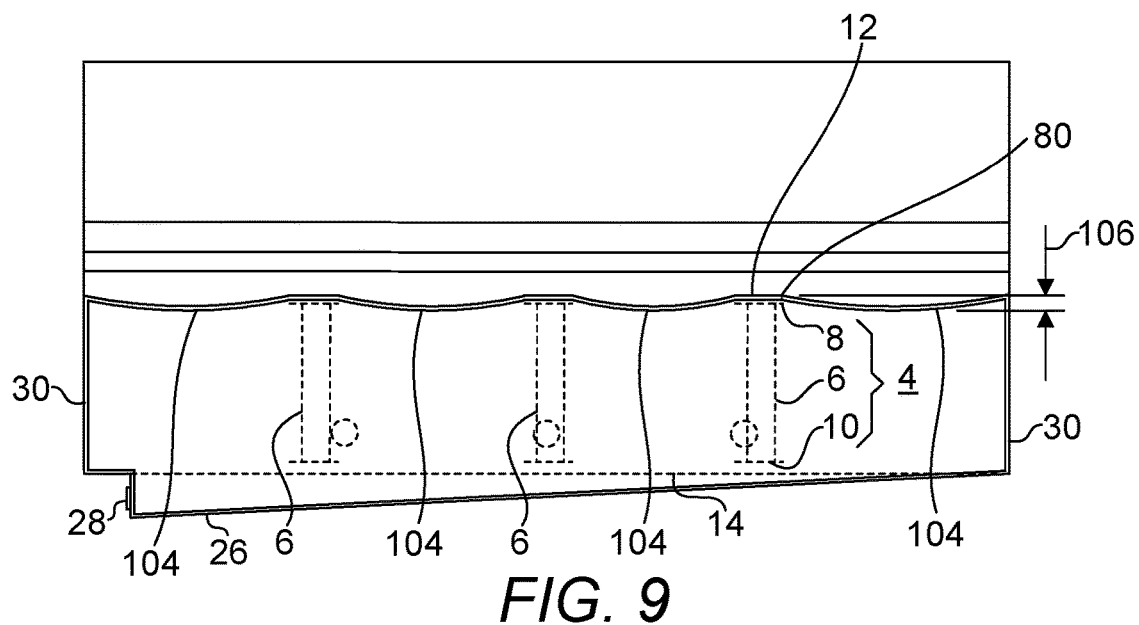
FIG. 9 is a partially transparent rear view of a holding tank having a deck sheet that is not properly secured where the deck sheet has been damaged due to repeated applications of partial vacuum.

FIG. 9 is a partially transparent rear view of a holding tank having a deck sheet 12 that is not properly secured (e.g., the deck sheet 12 is simply supported by one or more support assemblies including support pillars 6 and support strips 8 but not attached to either the support pillars 6 and the support strips 8) where the deck sheet 12 has been damaged due to repeated applications of partial vacuum which resulted in stretched portions 104 that droop downwardly or "belly" between support pillars 6 towards the interior of the holding tank 2. Excessive droops 106 in the deck sheet 12 make for an uneven surface to load cargo, e.g., portable toilets, upon the deck sheet 12. Strain is the response of a material to an applied stress. When the deck sheet 12 is loaded with forces pulling towards the interior of the holding tank 2, the pulling forces produce stresses, which then cause the deck sheet 12 to deform. Engineering strain is defined as the amount of deformation in the direction of the applied force divided by the initial length of the material. Therefore, at a particular strain, the amount of deformation (of the deck sheet 12) in the direction of the force experienced in the deck sheet, increases with an increase in the initial length of the material (e.g., the entirety of the width of the deck sheet 12 as shown in FIG. 9 as compared to the distance between two consecutive support pillars 6 or support strips 8, had the deck sheet 12 been fixedly secured to the two consecutive support pillars 6 and/or support strips 8). Excessive deformation of the deck sheet 12 and alternating stresses to the already stretched and weakened deck sheet 12 can lead to cracking, e.g., fatigue cracking that eventually cause the formation of cracks 80, of the deck sheet 12, resulting in the holding tank 2 losing its ability to maintain airtight operations. The reinforcing strips 10 and the support strips 8 are mild steel strips 2.5 inches wide and 3/16 inch thick. The support pillars 6 are made from tubular mild steel having an outside diameter of 1.5 inches and a wall thickness of 3/16 inch. Within each support assembly 4, the support pillars 6 are spaced at 24 inches intervals. Each indent has an indented area of 24 inches×10 inches.

Figure 10:
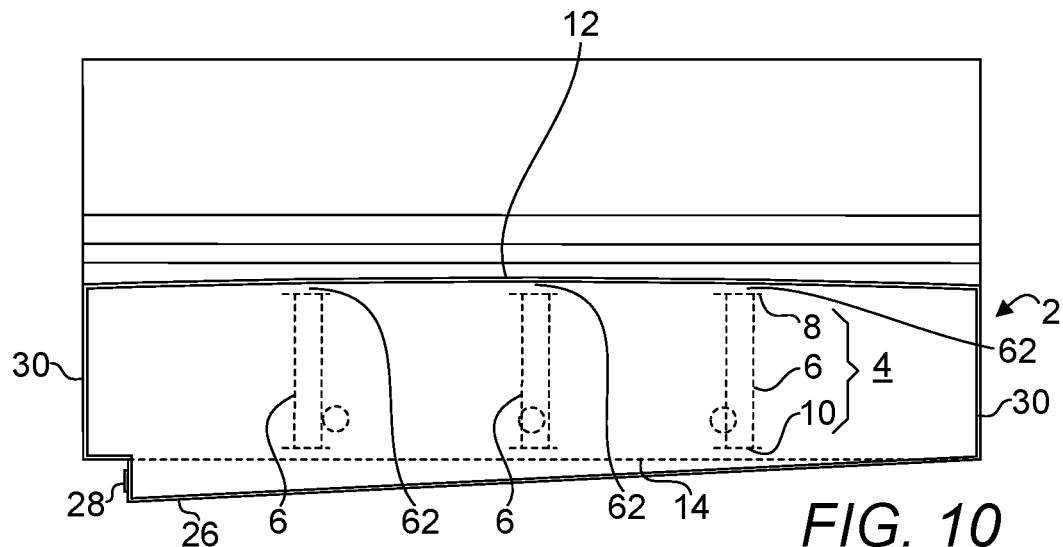
FIG. 10 is a partially transparent rear view of a holding tank having a deck sheet that is not properly secured where the deck sheet has been stretched due to repeated applications of positive pressure to the holding tank.

FIG. 10 is a partially transparent rear view of a holding tank having a deck sheet that is not properly secured where the deck sheet has been stretched due to repeated applications of positive pressure to the holding tank to facilitate unloading of the contents of the holding tank. The effect to the deck sheet 12 subjected to positive pressure to the holding tank, trends in the opposite direction compared to the effect experienced by the deck sheet 12 as shown in FIG. 9. As positive pressure, e.g., 2 psi, is applied to the holding tank 2, the holding tank 2 bulges, leaving a gap 62 between the deck sheet 12 and the support assemblies 4.

Figure 11:
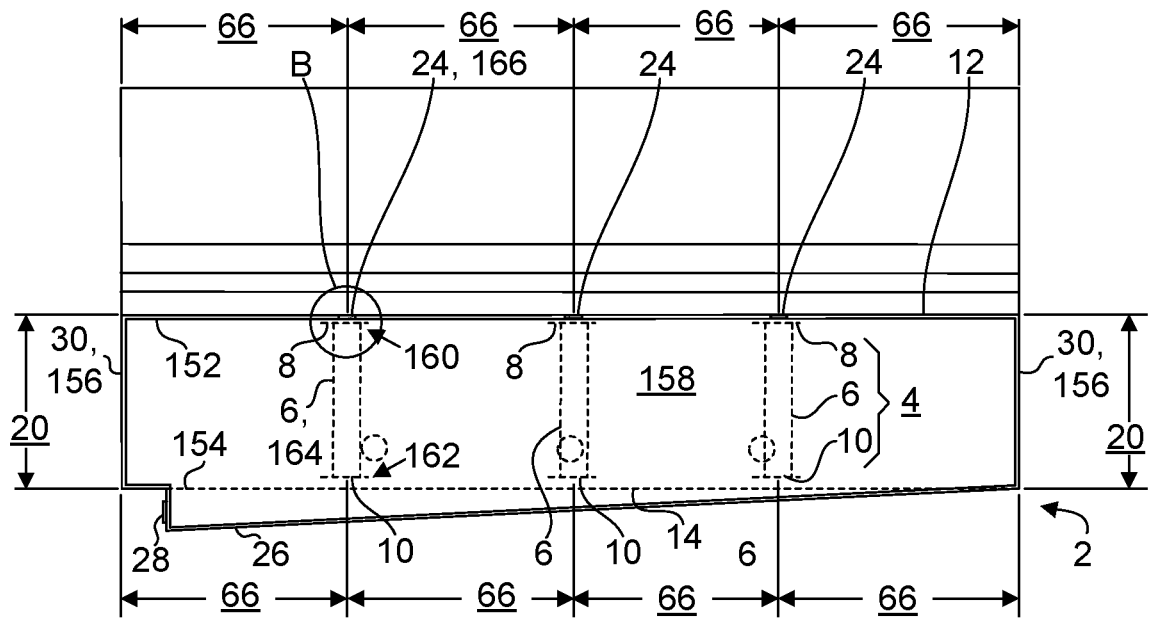
FIG. 11 is a partially transparent rear view of a holding tank having a deck sheet that has been properly secured where the deck sheet has been secured to support pillars.
Figure 12:
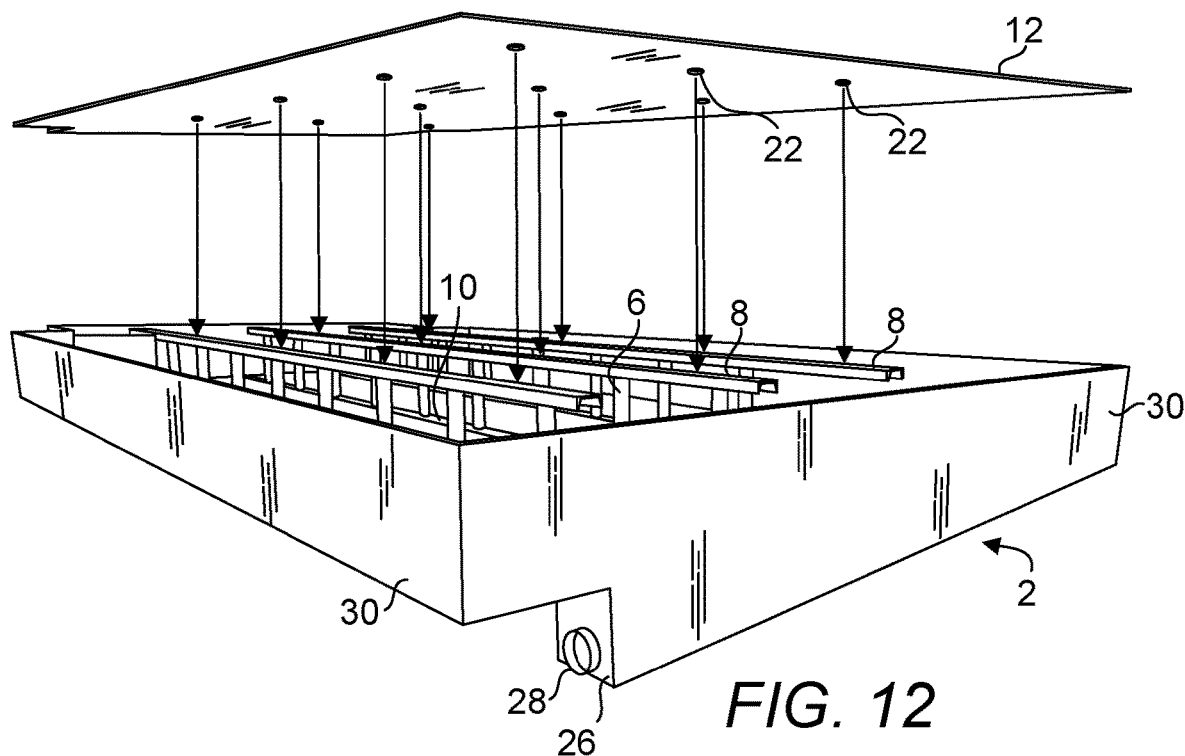
FIG. 12 is a left side rear exploded perspective view of a holding tank with its deck sheet removed to show a manner in which the deck sheet is aligned with support assemblies disposed therewithin.
Figure 13:
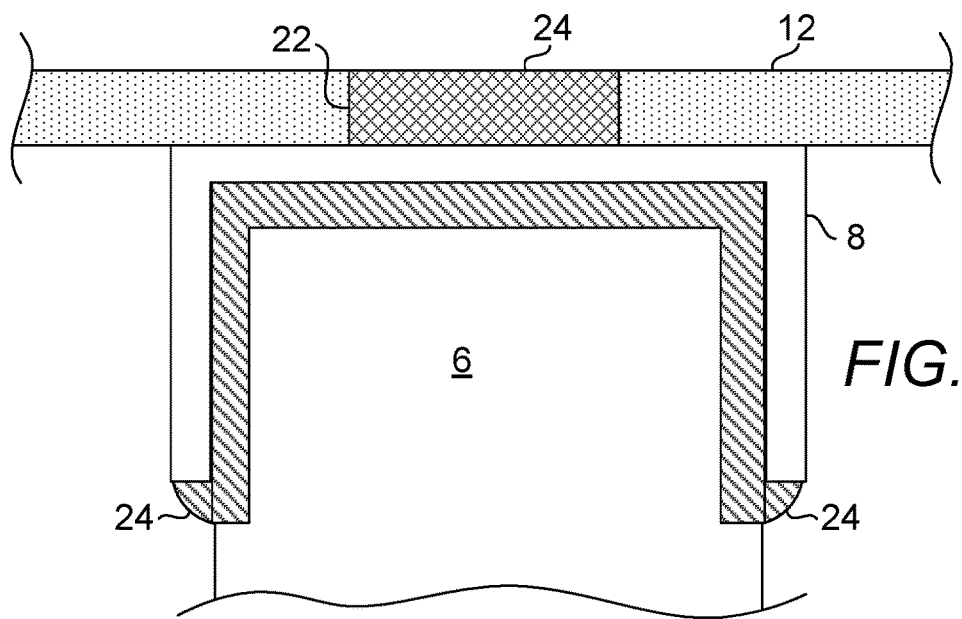
FIG. 13 is a partial close-up view of a portion of the holding tank labelled as B in FIG. 11.

FIG. 11 is a partially transparent rear view of a holding tank having a deck sheet that has been properly secured where the deck sheet has been secured to support pillars. FIG. 12 is a left side rear exploded perspective view of a holding tank with its deck sheet removed to show a manner in which the deck sheet is aligned with support assemblies disposed therewithin. If the deck sheet 12 is not fixedly secured to the support strip 8 and/or support pillar 6, a maximum droop of about 1 inch may result in a span 66, 78 of deck sheet 12 of mild steel of thickness of no greater than ¼ inch after over 40,000 applications of vacuum of 10" of mercury. Stainless steel is often used in corrosive and/or moist environments. However, if stainless steel of similar thickness is used for the construction of the holding tank, cracking can occur more readily due not only to the repeated applications of partial vacuum but also to roading stresses, etc. Although aluminum may also be suitable, it can fatigue more readily than mild steel. As the holding tank 2 is required to be airtight, precautions must be taken during the construction of the holding tank 2 to ensure that the holding tank 2 can meet this requirement. For the construction of a large object such as the holding tank, it is often more efficient to assemble or build the object in a manner so that the resulting object is already disposed in an orientation suitable for final assembly onto a truckbed to avoid the need to flip or rotate a large weight before attaching the object to the truckbed. Therefore, the holding tank 2 is built from the ground up, e.g., a tank floor sheet 14 is laid before the walls 30 and reinforcing strips 10, etc., that are all disposed atop the tank floor sheet 14, are welded to the top surface of the tank floor sheet 14. However, if desired, the order in which the holding tank is built may be reversed if the eventual flip of the folding tank can be performed and tolerated. If the order is reversed, the sheet that is attached last to the support assemblies would be the tank floor sheet 14 and the portion of the support assemblies to be attached to would be the reinforcing strips 10. Once all of the support assemblies 4 and other essential components have been disposed within the space delineated by the tank floor sheet 14 and walls 30, the space is ready to be closed off with a deck sheet 12. A suitably-sized and shaped deck sheet 12 is eventually disposed atop the space and secured to the walls 30. The edges of the deck sheet 12 are welded to the top edges of the walls 30. However, if nothing else is done, the deck sheet 12 is simply supported on a plurality of support assemblies 4. Various fasteners, e.g., screws and tapped holes, may be used to secure the deck sheet 12 and support strips 8 together. However, if fasteners are used, each of these fasteners may fail due to corrosion, fatigue, etc., causing the holding tank to fail to be airtight and useful for its intended purposes. Applicant discovered that if the deck sheet 12 can be secured to the support assemblies 4 or another support structure of the holding tank from outside of the space defined by the tank floor sheet 14, peripheral walls 30 and the deck sheet 12 without using fasteners, a long-lasting, strong and relatively lightweight holding tank can result. Disclosed herein is a technique for securing the deck sheet 12 to the support assemblies 4. Each row of support assemblies includes a plurality of spaced-apart support pillars 6 that are each welded at one end to a support strip 8, e.g., one which comes in the form of a channel, and at the other end to a reinforcing strip 10. Shown herein are three rows of support assemblies 4 each aligned generally in parallel to a side wall 30. A plurality of spaced-apart holes 22 are disposed on the deck sheet 12 to coincide with each support strip or channel 8 when the deck sheet 12 is laid atop the support strip or channel 8. Upon laying the deck sheet 12 atop the support assemblies 4, the deck sheet 12 is ready to be secured to the support strips 8 given the access via holes 22 to support strips 8 from outside of the interior space of the holding tank. FIG. 13 is a partial close-up view of a portion of the holding tank labelled as B in FIG. 11. It shall be noted that the deck sheet 12 is secured to each support strip 8 by plug welding each hole 22 open root with weld 24 sealing off all of the holes 22 to form an impermeable deck sheet 12. At each hole 22, plug welding shall be performed starting from the center of the hole 22 and ending at the perimeter of the hole 22 in circular motion until the weld has filled the entire hole 22. Therefore, although the deck sheet 12 is disposed over the support strips 8, access to the support strip 8 is not lost, wherein this access allows the deck sheet 12 to be welded to the support strips 8, effectively reducing the deck sheet dimensions subjected to strain by securing the deck sheet 12 at shorter distances rather than the entire length of width of the holding tank. As the holding tank 2 is a low profile transportable holding tank, there is insufficient space within the interior space of the holding tank to accommodate a worker to weld from inside the interior space of the holding tank.

Figure 14:
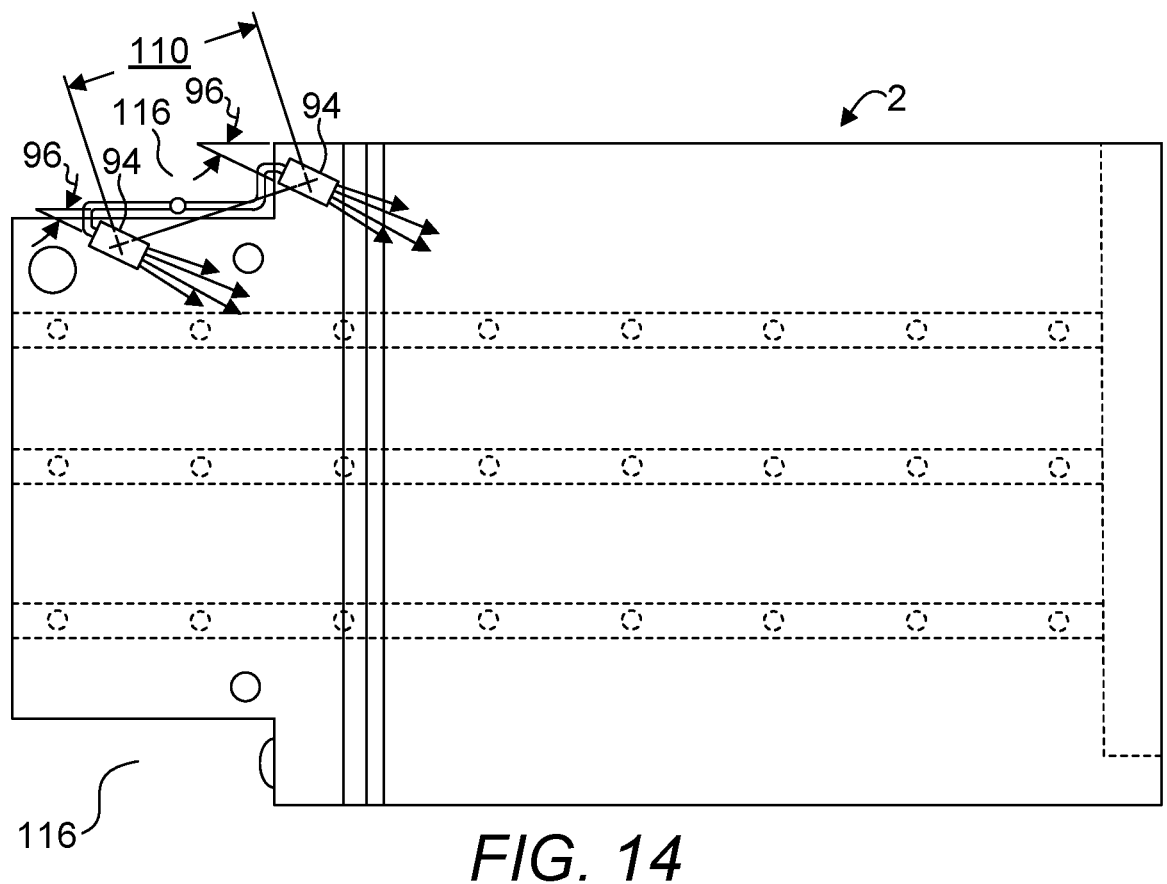
FIG. 14 is a partially transparent top view of a holding tank, depicting one embodiment of a self-cleaned low profile holding tank.
Figure 15:
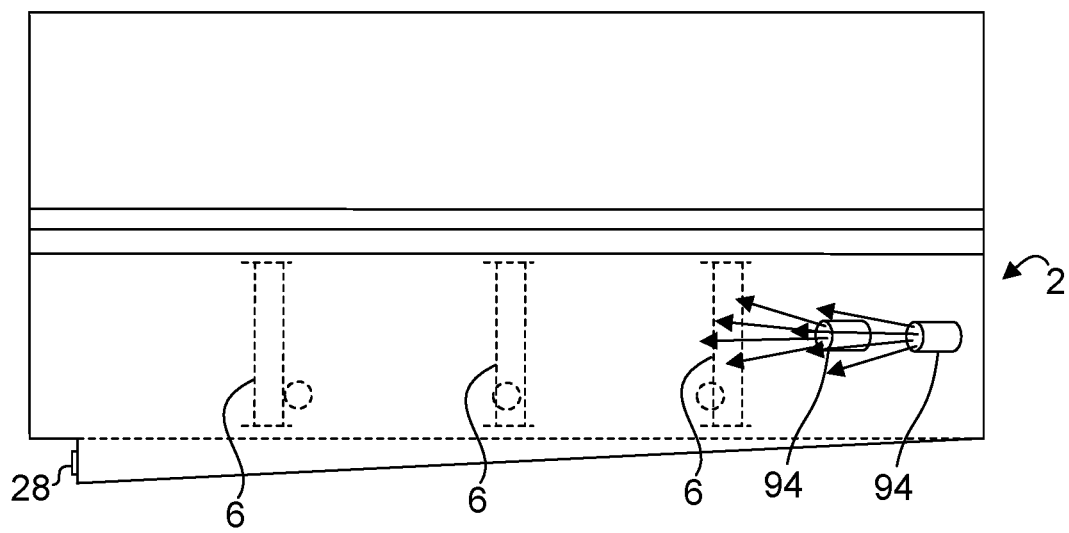
FIG. 15 is a partially transparent rear view of a holding tank depicting one embodiment of a self-cleaned low profile holding tank.

As a low profile holding tank is inaccessible to cleaning personnel, cleaning is typically carried out by first filling the low profile holding tank with water or a mixture of water, detergent or a mixture of water, detergent and disinfectant before the low profile holding tank is moved back and forth, e.g., by moving the truck upon which the low profile holding tank is disposed back and forth to create movements of water or mixture in the form of splashes/sloshes to aid in dislodging wastes adhered to surfaces, e.g., the peripheral walls, ceiling (bottom surface of deck sheet), floor (top surface of tank floor sheet). Regular cleaning of a holding tank ensures that corrosive agents that may be present in the holding tank can be removed to cease their continued attack of the on interior surfaces of the holding tank if vulnerable spots have formed on the interior surfaces. While the conventional technique may be effective to a limited degree in the cleaning of the interior surfaces of the holding tank, the cleaning process involves the use of the vehicle upon which the holding tank is disposed, increasing the wear-and-tear to the vehicle with frequent start and stop movements of the vehicle while carrying a large load of the holding tank, the effectiveness of the cleaning process is intimately related to the skills of the operator of the cleaning process and can be inconsistent. Applicant discovered that by suitably placing the two nozzles 94 in the interior space of a low profile holding tank, the holding tank can be properly cleaned. FIG. 14 is a partially transparent top view of a holding tank, depicting one embodiment of a self-cleaned low profile holding tank 2. FIG. 15 is a partially transparent rear view of a holding tank, depicting one embodiment of a self-cleaned low profile holding tank 2.

The depth 20 of the holding tank 2 is usually 1 ft. Some holding tanks may be as long as 20 ft and have a 1 ft or an 8-inch depth. Given the above measurements of the holding tank 2, various values of the aspect ratio can be calculated. For example, with the 10 ft long holding tank 2 one may divide the depth (1 ft) into the width at the indents (6 ft), into the more general width of 8 ft, into a width of 8.5 ft or into the length of 20 ft. The holding tank 2 therefore has aspect ratios of 6, 8, 8.5 and 20. Even the least of these values represents a significant departure from the "ideal" aspect ratio of 1. A holding tank 2 that is 20 ft long and 8 inches deep has aspect ratios as high as 30. A holding tank 2 of high aspect ratio presents a challenge to be cleaned because of its lack of accessibility due to the holding tank's depth that is much less than its length or width. Further, the size of the interior space that is rather large also presents a challenge to the reach and the number of cleaning nozzles that are required. Compared to a low profile holding tank where baffles are used to provide and enhance structural integrity to the holding tank, the present support assemblies 4 include pillars instead of baffles. The use of pillars minimizes the obstructions the support assemblies 4 present to sprays of water, mixture or steam from one corner to another diagonally opposed corner of the holding tank. Disclosed herein is a low profile holding tank having an aspect ratio of at least 6 and configured for holding a volume of waste of no less than about 100 gallons, the low profile holding tank including a generally rectangular interior space and only two nozzles. The holding tank has two sides, two front corners each corresponding to one of the two sides and two rear corners, each corresponding to one of the two sides. A discharge port is disposed on one of the rear corners of a first of the two sides and the front corners are disposed at an elevation higher than the rear corners. Each nozzle is configured for receiving a fluid supply of about 3 GPM at about 4000 psi and each nozzle is disposed within the space and fixedly attached within the space. The two nozzles are mounted on one of the front corners of a second of the two sides disposed opposite that of the first of the two sides. In one embodiment, each nozzle 94 is mounted with its heading 96 disposed at an angle of from about 20 to about 40 degrees with respect to the closest side wall 30 at which the nozzles 94 are disposed. An activation of the fluid supply system causes the interior space to be cleaned from the corner to which the only two nozzles are mounted to the corner at which the discharge port is disposed. In one embodiment, the two nozzles are spread apart from about 12 to about 18 inches. In one embodiment, the low profile holding tank is a low profile transportable holding tank.

Figure 16:
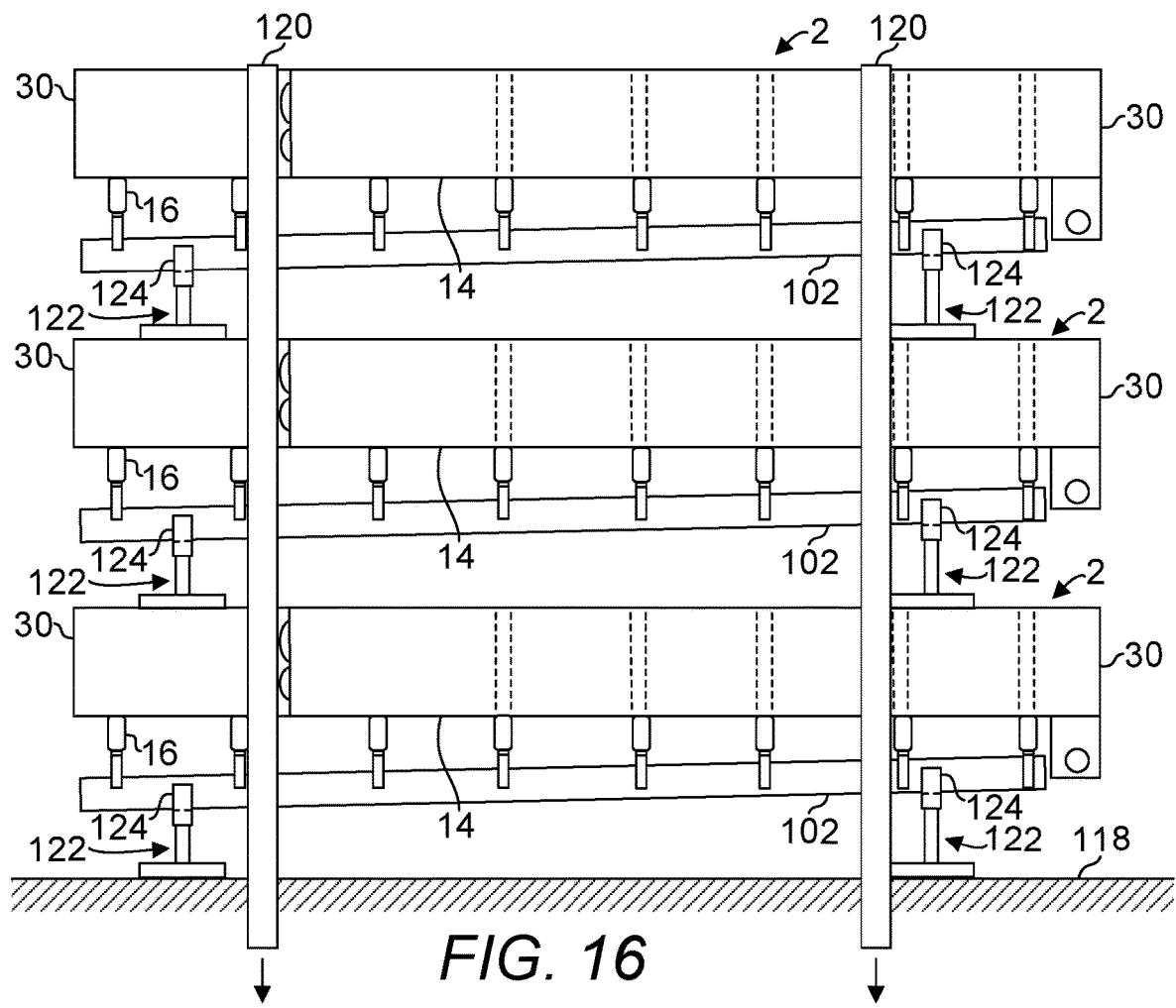
FIG. 16 is a side partial view of three holding tanks stacked and secured for transportation.
Figure 17:
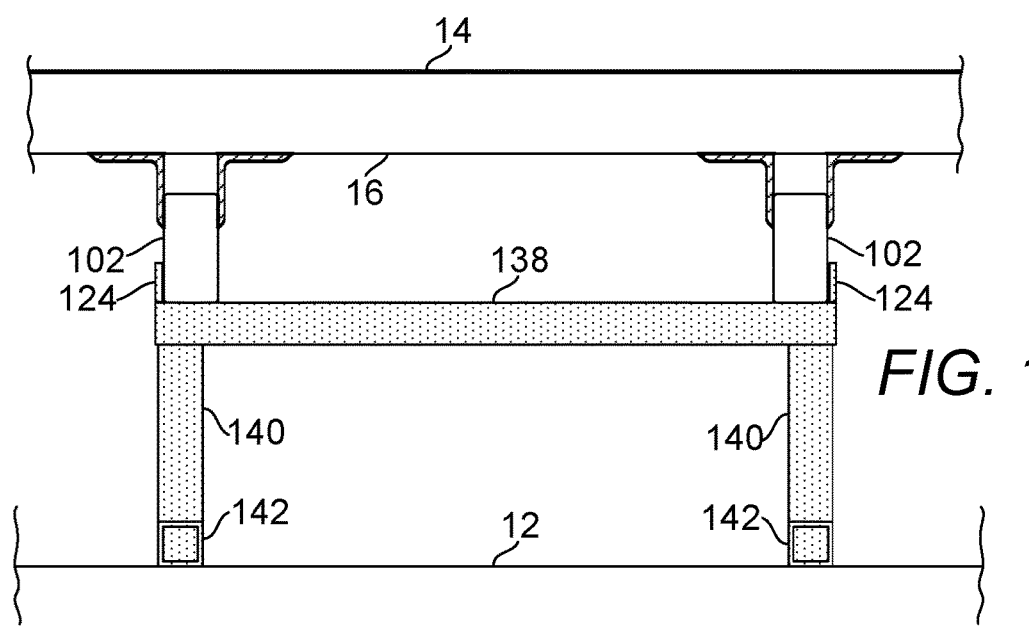
FIG. 17 is a front partial view of two holding tanks stacked for transportation.

FIG. 16 is a side partial view of three holding tanks 2 stacked and secured for transportation. FIG. 17 is a front partial view of two holding tanks stacked for transportation. During the construction or assembly of a holding tank, the finished or unfinished holding tank may need to be transported from one location to another. For instance, a holding tank built at a first location may be transported on a trailer deck 118 to be fitted on a truckbed at a second location as it would not be economically feasible to transport the truckbed (along with a truck) to be fitted with a holding tank. Applicant discovered a solution which allows holding tanks to be transported securely and economically from one location to another. Provided herein is a pair of support members 122 separating holding tanks 2 stacked upon one another. The height of each support member is preferably configured in a way to allow the holding tanks 2 to be stacked in a manner such that the deck 12 of each holding tank 2 is disposed parallel to the direction of travel of a vehicle transporting the holding tanks 2 in order to reduce wind resistance and tie-down requirements to secure the holding tanks in place for transportation. Each support member 122 includes essentially a pair of spread-apart support legs 140 held together by a cross bar 138 with all these parts disposed in a first plane. A stabilizer bar 142 is disposed at the bottom of each support leg 140 in a second plane that is disposed at a right angle to the first plane. As the second plane is disposed in a manner parallel to the direction of travel of a vehicle transporting the holding tanks 2, this increases the grip the support members provide to the two stacked holding tanks 2. Each support leg 140 is configured to extend upwardly on each outside wall of the support legs 140 into a tab 124 which limits lateral movements the supported holding tank 2 relative to the holding tank 2 underneath it. The stacked holding tanks 2 may be secured to a trailer deck 118 by using a plurality of straps 120.

Figure 18:
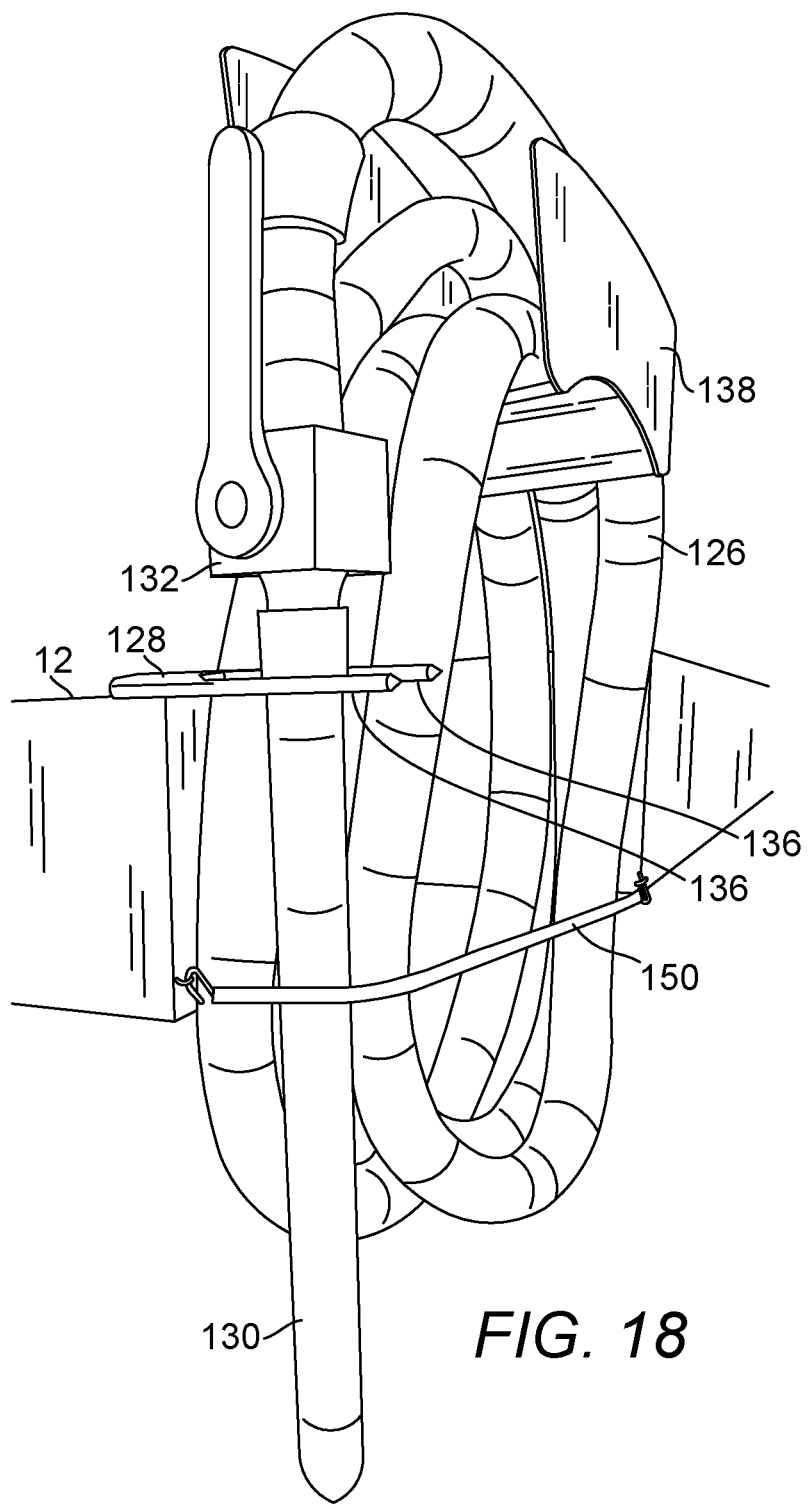
FIG. 18 is a diagram depicting a mechanism for enabling convenient stowage of a suction hose of a transportable sewage system.

FIG. 18 is a diagram depicting a mechanism for enabling convenient stowage of a suction hose 126 of a transportable sewage system. A suction system is critical for a sewage system to transfer sewage from a site to a transportable sewage system. The ease with which a suction hose can be deployed, cleaned and stowed away is critical in a sewage-gathering operation of the transportable sewage system. A suction hose provided with a transportable sewage system has a typical length of about 20-50 ft and has the free end equipped with a suction tip 130. At such length, the suction hose can be used to reach a septic tank disposed at a great distance. With the great length, gathering of the suction hose can pose a challenge. The tip 130 is essentially a rigid tube tapered to a reduced size at its free end and a valve 132 disposed at the base of the tip 130. Applicant discovered that a hose holder 134 around which the hose 126 can be coiled can facilitate the stowage of the hose 126 by allowing the hose 126 to be coiled and stowed neatly on the hose holder 134. A pair of hooks 128 with prongs 136 spread apart a distance appropriate to allow the tip 130 to be slid between the hooks 128, is provided. When the suction hose 126 is again needed, the tip 130 can again be slid out and released. Further, with the tip 130 pointing downwardly in the stowed position of the suction hose, any substantial moisture remaining in the hose upon getting cleaned can be drained, resulting in a clean hose. Upon stowing a hose 126, the hose along with its tip can be further secured using a strap 150, detachable at least at one point by means of a clasp.

Figure 19:
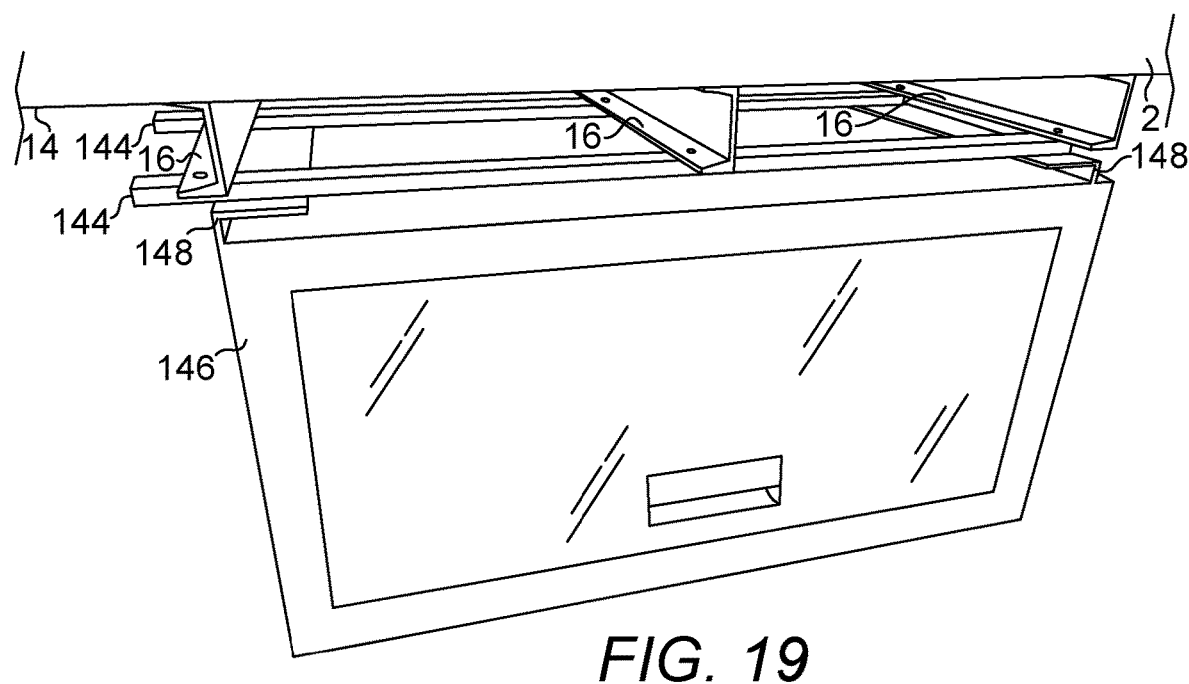
FIG. 19 is a diagram depicting a rail-based mechanism for allowing installation of various equipment or containers under a holding tank for securing and transporting various tools.

FIG. 19 is a diagram depicting a rail-based mechanism for allowing installation of various equipment or containers under a holding tank 2 for securing and transporting various tools. The rail-based mechanism preferably includes more than one rail 144, e.g., two rails, secured to at least two transverse support bars 16. Each rail 144 is essentially a channel having a path configured for receiving fasteners that are secured to mounting points of an equipment mounted to the rails 144. For instance, as shown herein, a tool box 146 is mounted at four points, each point being located substantially at one end of a mounting plate 148 of the toolbox. As each fastener is slidable along a path of a rail, the position of the toolbox in a lengthwise direction of the rail is adjustable before the fasteners are tightened against their respective nuts or other securing features to lock the tool box 146 in its preferred position. Although only a tool box 146 is shown, similar strategies can be applied to other equipment to secure them in place underneath the holding tank 2.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A low profile holding tank evacuable to a pressure differential of at least about 10" of mercury, said low profile holding tank comprising: at least one support structure, an upper outer layer of mild steel and a lower outer layer of mild steel, each of said upper outer layer and said lower outer layer is configured to be up to about ¼ inches thick and a peripheral wall, said upper outer layer, said lower outer layer and said peripheral wall cooperate to define a space, said at least one support structure is connected to said upper outer layer at an upper connection point and said at least one support structure is connected to said lower outer layer at a lower connection point, wherein at least one of said upper connection point and said lower connection point is made from outside of said space to prevent damages incurred on said low profile holding tank by repeated applications of the pressure differential of at least about 10" of mercury.

2. The low profile holding tank of claim 1, wherein said at least one of said upper connection point and said lower connection point is made using plug welding.

3. The low profile holding tank of claim 1, wherein said low profile holding tank is a low profile transportable holding tank.

* * * * *